Oct. 30, 1951  W. T. WHATLEY  2,573,633
MEANS FOR DEPHLEGMATING VAPORS
Original Filed Aug. 27, 1949  3 Sheets-Sheet 1

INVENTOR.
WILLIAM T. WHATLEY
BY
ATTORNEY

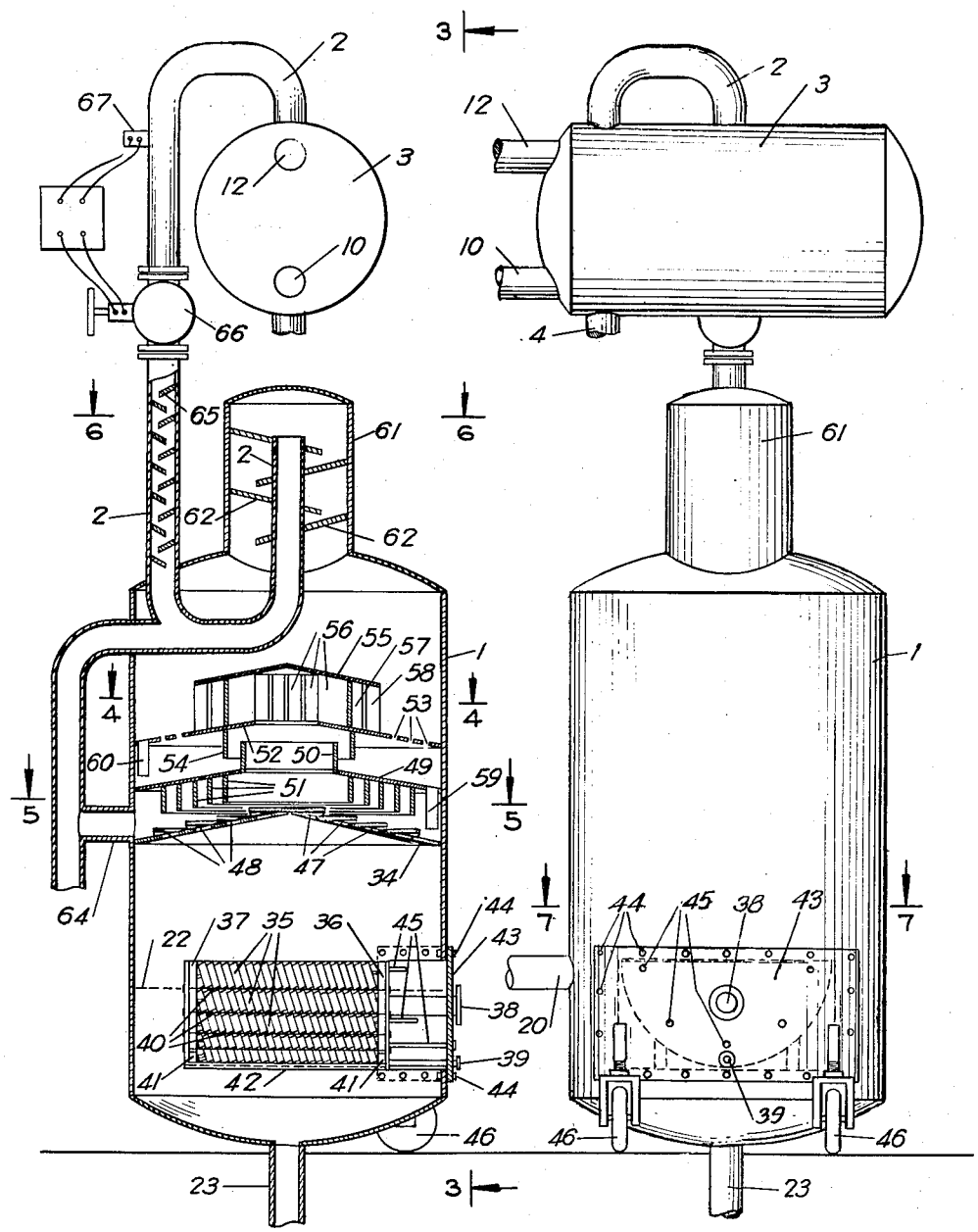

Oct. 30, 1951 W. T. WHATLEY 2,573,633
MEANS FOR DEPHLEGMATING VAPORS
Original Filed Aug. 27, 1949 3 Sheets-Sheet 3

INVENTOR.
WILLIAM T. WHATLEY
BY
ATTORNEY

Patented Oct. 30, 1951

2,573,633

UNITED STATES PATENT OFFICE 2,573,633

MEANS FOR DEPHLEGMATING VAPORS

William T. Whatley, Port Arthur, Tex.

Original application August 27, 1949, Serial No. 112,755. Divided and this application July 3, 1950, Serial No. 171,925

3 Claims. (Cl. 183—104)

This application is a division of my copending application, Serial No. 112,755, filed August 27, 1949, now abandoned.

The invention concerns certain improvements which have been incorporated in a system for distilling sea water as hereinafter described. It involves improvements of method as well as apparatus, all of such improvements being related and cooperating to produce a common result. Although the invention is intended more particularly for use in the distillation of sea water, as on ships, it is applicable also to the distillation of water generally and for other purposes.

In the past a number of systems have been devised for the distillation of sea water aboard ship, but as far as is known none of them has been entirely successful. Some of the systems now in use are either too costly for continuous operation or have other disadvantageous features, and such systems are used, if at all, on an emergency basis only.

In the operation of ships heretofore it has been necessary to carry all water used, including water for the boilers in the case of steamships, and a saving of valuable cargo space can be effected by distillation of sea water. The need for purchasing water while in port can be eliminated also by this means.

In the distillation of sea water aboard ship it is desirable to employ exhaust steam and waste heat from other sources as far as practicable. But ordinarily the supply of waste heat from all sources is limited, and it has been necessary heretofore to use considerable quantities of live steam also, which results in increased fuel consumption. In some systems the distillation of sea water is carried out under vacuum in order to lower the temperature required.

In some systems now in use the process for distilling sea water is intimately associated with and dependent upon the operation of the ship's main power plant for cooling as well as heating. The process is affected not only by the temperatures of the heating and cooling fluids but also by the volumes thereof which may be available. It is also affected by variations in temperature of the cold charge. All of these factors are difficult to regulate in such systems, and this is particularly true when the operation of the main power plant is curtailed, as when the ship is in port or maneuvering.

It is an object of the invention to provide a system of the type described which is substantially complete in itself and which may be operated equally as well whether the ship is proceeding under full steam or lying in port or maneuvering, and which is not affected adversely by variations in sea water temperatures throughout the world. It is also an object of the invention to provide a system which is applicable to motor vessels as well as steamships.

In the distillation of sea water the density of the resulting brine is increased as evaporation thereof proceeds, and scale deposits are formed on the heating coils of the evaporator. This reduces the heat transfer efficiency of the coils. It has been the practice heretofore to discard continuously a portion of the brine in order to maintain the brine remaining in the system at a predetermined maximum density. This tends to minimize scale deposition and to produce distilled water of good quality. But it also results in considerable heat loss, and excessive brine densities are sometimes tolerated for that reason.

It is an object of the invention to provide a system in which sea water charged to the process is passed in heat interchange relation with the hot brine discarded from the process, thereby effecting a substantial recovery of heat from the brine. The process of the invention may be operated with relatively low brine densities by making it possible to discard relatively large quantities of brine from the system without excessive loss of heat. Thus the deposition of scale on the heating coils is minimized and distillate of good quality is assured.

It is also an object of the invention to provide a system in which a part of the charge is cold sea water which is passed in heat interchange relation with the vapors generated in the process, thereby effectively cooling and condensing the vapors while heating the charge. This permits the volume as well as the temperature of the cooling water to be definitely controlled.

Another object of the invention is to provide a speedy and effective method for removing scale deposits from the heating coils of the evaporator, in systems of the type described. Methods which have been devised heretofore for that purpose have been time consuming and of doubtful efficiency, ordinarily involving a complete shutdown of the equipment for a period of several hours.

A still further object of the invention is to provide a system which is resistant to priming and in which contamination of the distillate with salt water is effectively prevented. The invention includes an improved evaporator and dephlegmator having a novel combination of baffles and drains adapted to effectively remove entrained liquid from the vapors.

A novel feature of the invention is the provision of a vapor line having in conjunction therewith a solenoid operated valve adapted to close the line upon being actuated by a salinity cell in response to the presence in the line of salt water or vapors.

The invention also includes a novel arrangement of heating coils and means for supporting the heating coils in the evaporator whereby they may be readily installed in and removed therefrom.

An advantageous feature of the invention is that there is no drainage to the bilge, all of the material discarded from the process being forcibly discharged overboard, preferably below the water line.

Another advantageous feature of the invention is that the system requires relatively few pumps. This tends to prevent the leakage of air into the system, which interferes with the operation of the pumps and is capable of affecting the ship's main power plant as well as the water distillation system.

The system described herein is simple and reliable in operation and may be operated largely by use of automatic controls. The equipment involved requires a comparatively small investment and the operating cost is relatively small.

The invention will be readily understood by referring to the following description and the accompanying drawing, in which:

Fig. 2 is an enlarged view in elevation, partly in section, showing a portion of the apparatus indicated in Fig. 1.

Fig. 3 is a view in elevation taken on the line 3—3 of Fig. 2.

Figure 1:
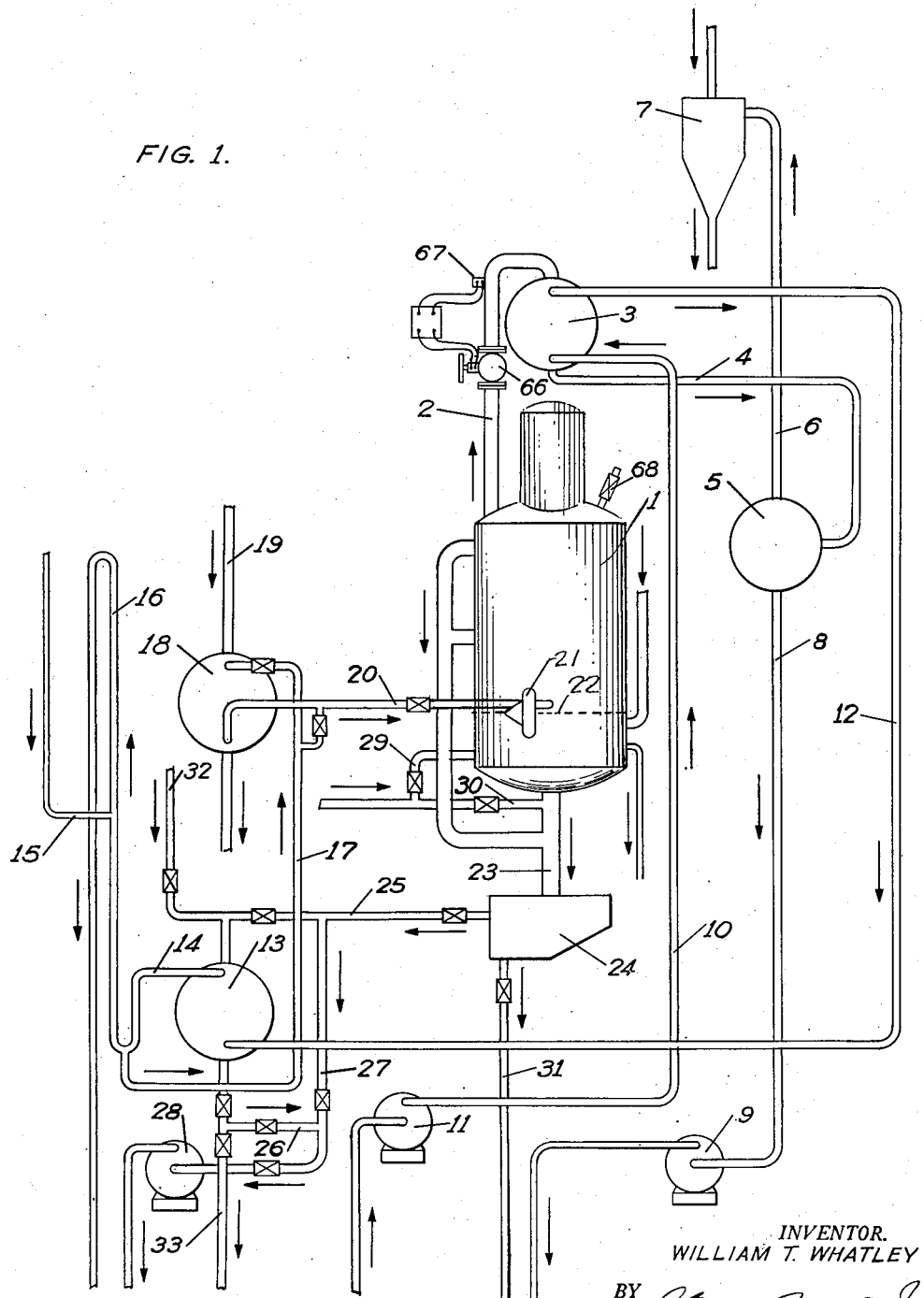
Fig. 1 is a diagrammatic view in elevation illustrating apparatus suitable for carrying out the process of the invention.
Figure 4:
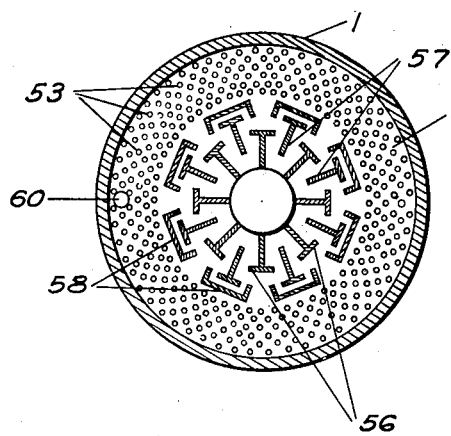
Fig. 4 is a sectional plan view taken on the line 4—4 of Fig. 2.
Figure 7:
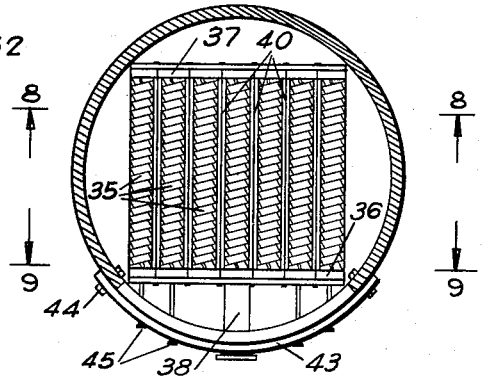
Fig. 7 is a sectional plan view taken on the line 7—7 of Fig. 3.
Figure 5:
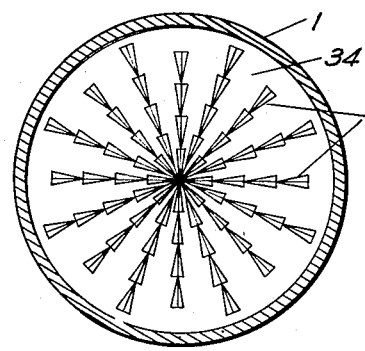
Fig. 5 is a sectional plan view taken on the line 5—5 of Fig. 2.
Figure 8:
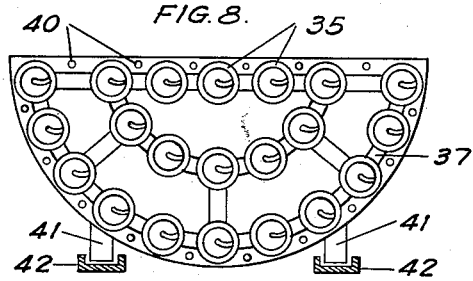
Fig. 8 is an enlarged sectional view in elevation taken on the line 8—8 of Fig. 7.
Figure 6:
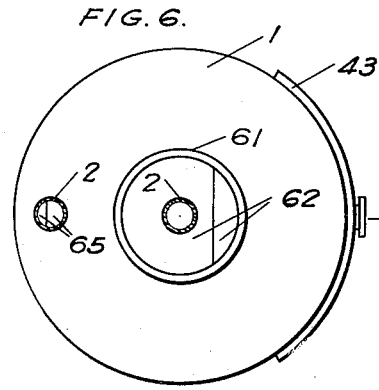
Fig. 6 is a sectional plan view taken on the line 6—6 of Fig. 2.
Figure 9:
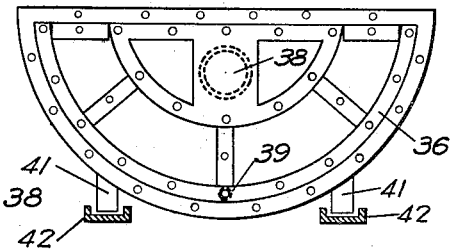
Fig. 9 is an enlarged sectional view in elevation taken on the line 9—9 of Fig. 7.

Referring to the drawing, a combined evaporator and dephlegmator 1 is provided which is connected by a vapor line 2 to a condenser 3. Condensate from the condenser 3 is delivered by line 4 to an accumulator drum 5. The vapor space of the accumulator drum 5 is connected by line 6 to a jet pump 7 whereby the system is maintained under vacuum. Usually aboard steamships a vacuum line is available in connection with the ship's main power plant, such vacuum line being the equivalent of the jet pump 7. Liquid is withdrawn from the accumulator drum 5 thru line 8 by the action of pump 9. Alternatively the pump 9 may be eliminated and the condensate may be delivered to storage tanks by gravity.

A portion of the charge to the process is cold sea water, which is first passed in heat exchange relation with vapors delivered to the condenser 3, being delivered to the condenser 3 thru line 10 by the action of pump 11. Aboard ship there is usually a sanitary line which may be used as a convenient source of cold salt water under pressure, the sanitary line being the equivalent of the line 10 and the pump 11. The partially heated charge is withdrawn from condenser 3 by line 12 and delivered to a heat exchanger 13 where it is passed in heat exchange relation with hot brine withdrawn from the evaporator 1 as hereinafter described. The portion of the charge so heated is withdrawn from the heat exchanger 13 by line 14, and at this point it is combined with an additional portion of charge which may consist of partially heated sea water previously used as cooling water in the ship's main condenser, the latter being introduced to the process thru line 15. A water leg 16 is provided whereby a portion of the condenser water moving thru line 15 may be collected for use in the process, the remainder going overboard. The combined charge is delivered by line 17 to a heater 18 where it is further heated as necessary by steam delivered to the heater 18 thru line 19. The heater 18 may be bypassed with all or part of the charge if desired. The heated charge is delivered to the evaporator 1 thru line 20, a liquid level regulator 21 being provided to maintain a constant level in the evaporator 1 as indicated by the dotted line 22.

A portion of the hot brine is continuously discharged from the evaporator 1 thru line 23. The line 23 delivers the brine to a scale trap 24, where the solid material is settled out. The brine is withdrawn from the scale trap 24 thru line 25 and delivered to the heat exchanger 13 where it is used to heat a portion of the charge as above described. Thereafter it is discharged overboard, preferably below the water line, thru lines 26 and 27 by the action of pump 28. Alternatively a jet pump may be substituted for the pump 28, cold salt water under pressure, as from the sanitary line, being used to activate the jet pump. Use of a jet pump is preferable as it eliminates leakage of air into the system, thus preventing air locks which interfere with operation of the pumps.

Steam may be delivered to the evaporator 1 and the line 23 thru lines 29 and 30 for use in removing scale from the heating coils as hereinafter described and for cleaning the scale trap 24. A line 31 is provided for discharging the contents of the scale trap 24 overboard during cleaning, the line 25 being bypassed during this operation. Similarly, steam may be delivered to the heat exchanger 13 thru line 32. A line 33 is provided for discharging the contents of the heat exchanger 13 overboard during cleaning, the heat exchanger 13 being bypassed and the line 25 being connected directly to line 27 during this operation.

The evaporator and dephlegmator 1 comprises a vertically disposed cylindrical vessel which is divided into an upper section and a lower section by a baffle 34 as hereinafter described. Vapors are generated in the lower section and the resulting vapors are dephlegmated in the upper section.

A bundle of heating tubes 35 is provided in the lower section of the vessel 1. The heating tubes 35 are helical and are arranged in side by side relation to each other, being joined at their ends to headers 36 and 37. The headers 36 and 37 are semi-circular, and the tubes 35 are divided by the header 36 into an inside row and an outside row. A steam inlet 38 connects with the inside row and a steam outlet 39 connects with the outside row, the two rows being connected by the header 37. The tube bundle is reinforced by tie rods 40 which are joined at their ends to the headers 36 and 37 and spaced about the periphery thereof. The headers 36 and 37 are provided with downwardly extending foot-like members 41 which slidably engage horizontally disposed channel-like members 42, the channel-like members 42 being rigidly secured within the vessel 1.

An opening is provided in one side of the vessel 1 whereby the tube bundle may be inserted in and withdrawn from the vessel, the opening being closed by a cover member 43. The cover member 43 is secured to the vessel 1 by means of bolts 44. The header 36 is rigidly secured to the cover member 43 by means of bolts 45 whereby the tube bundle and the cover member 43 may be handled as a unit in inserting the tube bundle in the vessel 1 and withdrawing it therefrom. The steam inlet 38 and the steam outlet 39 extend thru the cover member 43. A pair of dolly wheels 46 are secured to the cover member 43 and adapted to support the cover member 43 and one end of the tube bundle while inserting the tube bundle in the vessel 1 and withdrawing it therefrom.

The baffle 34 is conically shaped, being inclined upwardly from the circumference thereof toward the center. A plurality of radially extending slots 47 are provided in the baffle 34 whereby vapors may pass from the lower section of the vessel 1 to the upper section thereof. The slots 47 are staggered with respect to each other, and each of them is covered by a hood-like member 48 which is adapted to deflect the vapors outwardly and downwardly toward the circumference of the vessel 1. For convenience and simplicity the hood-like members 48 may be made of angle iron and may be triangular in horizontal as well as vertical cross section.

A second conically shaped baffle 49 is positioned directly above the baffle. The baffle 49 is provided with a central opening which is surrounded by an upstanding annular flange 50. A plurality of depending concentric annular baffles 51 are secured at their upper edges to the baffle 49 and tend to deflect vapors passing inwardly and upwardly toward the central opening.

A third conically shaped baffle 52 is positioned directly above the baffle 49. The baffle 52 is provided with perforations 53 adjacent its circumference, and is provided also with a central opening which is surrounded by a depending annular baffle 54. The baffle 54 is secured at its upper edge to the baffle 52 and tends to deflect vapors passing outwardly and upwardly toward the perforations 53.

A fourth conically shaped baffle 55 is positioned directly above the baffle 52, the diameter of the baffle 55 being smaller than that of the vessel 1. Interposed between the baffles 52 and 55 are three concentric rows of baffles 56, 57 and 58 which are staggered with respect to each other, the baffles 56 and 57 being T-shaped in horizontal cross section and the baffles 58 being channel-shaped. The baffles 56, 57 and 58 are joined at their upper and lower edges to the baffles 52 and 55 and tend to deflect vapors passing outwardly toward the periphery of the vessel 1.

The baffles 49 and 52 are provided with downspouts 59 and 60, respectively, whereby liquid collecting adjacent the periphery of the baffles 49 and 52 will be caused to pass downwardly to the baffle immediately below, finally draining to the scale trap 24 as hereinafter described.

A dome 61 is superimposed above the vessel 1, and a plurality of inclined baffles 62 are positioned therein for the further dephlegmation of vapors. The baffles 62 are positioned one above the other and on alternate sides of the dome 61. The lower end of the vapor line 2 extends downwardly into the vessel 1 and then upwardly again into the dome 61, the baffles 62 being arranged around it. The arrangement is such that vapors are caused to pass upwardly into the dome 61 from the vessel 1, around the outside of the vapor line 2, and then downwardly and upwardly again thru the vapor line 2. A drain pipe 63 is connected to the vapor line 2 at its lowermost point. The drain pipe 63 is connected also to a drain pipe 64 which communicates with the interior of the vessel 1 immediately above and adjacent the periphery of the baffle 34. The lower end of the drain pipe 63 is connected to the line 23, which in turn drains to the scale trap 24.

A plurality of inclined baffles 65 are positioned in the vapor line 2 between the vessel 1 and the condenser 3 for further dephlegmation of vapors. A valve 66 is positioned in the vapor line 2, the valve 66 being operable manually as well as by solenoid. A salinity cell 67 is positioned in the vapor line 2 above the valve 66, and the arrangement is such that the valve 66 is closed by action of the solenoid in response to the presence in the vapor line 2 of salt water or vapors.

In the operation of the system liquid collecting in the upper portion of the vessel 1 as well as in the vapor line 2 drains immediately to the scale trap 24. This arrangement tends to prevent priming and the distillate is further prevented from becoming contaminated with salt water by action of the solenoid operated valve 66.

The distillation process is carried out under vacuum as above described, and the charge is preheated to a temperature approximating the temperature at which water is vaporized at the low pressure obtaining in the evaporator. Thus the temperature of the charge entering the evaporator may be in the neighborhood of 146° F., assuming that the evaporator is maintained under 28" of vacuum. The remaining heat required for distillation is supplied by the heating coils in the evaporator. Steam used in the heater 18 as well as in the heating coils of the evaporator 1 is exhaust steam, supplemented as necessary by live steam. Water resulting from condensation of steam is recovered.

The charge is preferably introduced into the evaporator 1 immediately above the liquid level. The heating coils are at least partially immersed in liquid, a portion of the heating coils preferably being positioned in the vapor space above the liquid level whereby they tend to dry the vapors and to separate unvaporized liquid therefrom.

The invention includes a novel method for removing scale which is deposited on the heating coils as evaporation of the brine proceeds. The method of removing the scale involves shock treatment of the scale by subjecting it alternately to extremes of temperature as well as pressure as hereinafter described. The invention contemplates that by continuously discarding a relatively large portion of the brine the operation may be carried out for long periods of time without interruption of the process to remove scale from the coils. Sufficient brine is continuously discarded to maintain the density of the brine remaining in the system at about $1/32$ and preferably not greater than $2/32$. This results in the production of distillate of good quality. Preferably the operation is continued until a substantial deposit of scale has formed on the heating coils.

The method of removing scale from the heating coils is as follows: The valve 66 is closed and pressure is allowed to build up in the vessel 1, a pressure relief valve 68 being provided for safety. After a pressure of about 30 pounds, for example, has been generated within the vessel 1 the charge line 20 is closed, the line 25 is bypassed, and the line 31 is opened whereby the contents of the vessel 1 as well as the scale trap 24 are discharged overboard by the accumulated pressure. The line 31 is then closed and the heating coils are further dried by admitting steam to the vessel 1 thru line 29, the valve 66 being opened and the evaporator 1 being under vacuum. Cold sea water is then drawn into the vessel 1 thru the line 31 by the action of the applied vacuum, the cold water cooling the outside of the heating coils while the inside thereof is being heated vigorously with steam. The cycle is repeated several times, the entire operation being completed within a relatively short time.

The invention may be modified in various ways without departing from the spirit and scope thereof.

I claim:

1. In apparatus of the character described, means for dephlegmating vapors comprising a vertically disposed cylindrical vessel, a pair of conically shaped baffles positioned within the vessel and disposed one above the other, each of the conical baffles being inclined upwardly from the circumference thereof toward the center, the lowermost conical baffle being perforated adjacent its circumference and having a central opening surrounded by a depending annular baffle, the uppermost conical baffle being smaller in diameter than the lower one, and a plurality of baffles interposed between the two conical baffles, the last mentioned baffles being disposed vertically and being joined at their upper and lower edges to the adjacent conical baffles.

2. In apparatus of the character described, means for dephlegmating vapors comprising a vertically disposed cylindrical vessel, a series of four conically shaped baffles positioned within the vessel and disposed one above the other, each of the conical baffles being inclined upwardly from the circumference thereof toward the center, the lowermost of the conical baffles being provided with a plurality of radially extending slots, the slots being staggered with respect to each other and each of them being covered by a hood-like member which is triangular in horizontal as well as vertical cross section, the second conical baffle having a central opening surrounded by an upstanding annular flange, a plurality of depending concentric annular baffles being secured at their upper edges to the second conical baffle, the third conical baffle being provided with perforations adjacent its circumference and having a central opening surrounded by a depending annular baffle, the fourth conical baffle being of smaller diameter than the others, and a plurality of baffles interposed between the two uppermost conical baffles; the last mentioned baffles being disposed vertically and being joined at their upper and lower edges to the adjacent conical baffles.

3. In apparatus of the character described, means for dephlegmating vapors comprising a vertically disposed cylindrical vessel, a series of four conically shaped baffles positioned within the vessel and disposed one above the other, each of the conical baffles being inclined upwardly from the circumference thereof toward the center, the lowermost of the conical baffles being provided with a plurality of radially extending slots, the slots being staggered with respect to each other and each of them being covered by a hood-like member which is triangular in horizontal as well as vertical cross section, the second conical baffle having a central opening surrounded by an upstanding annular flange, a plurality of depending concentric annular baffles being secured at their upper edges to the second conical baffle, the third conical baffle being provided with perforations adjacent its circumference and having a central opening surrounded by a depending annular baffle, the fourth conical baffle being of smaller diameter than the others, and three concentric rows of baffles interposed between the two uppermost conical baffles and staggered with respect to each other, the two innermost rows being T-shaped in horizontal cross section and the outer row being channel-shaped, each of the T-shaped baffles and channel-shaped baffles being joined at its upper and lower edges to the adjacent conical baffles.

WILLIAM T. WHATLEY.

REFERENCES CITED

The following references are of record in the file of this patent:

UNITED STATES PATENTS

| Number | Name | Date |
|---|---|---|
| 971,258 | Dunn | Sept. 27, 1910 |
| 1,319,574 | DiSante | Oct. 21, 1919 |
| 1,737,648 | Edsall | Dec. 3, 1929 |
| 1,934,674 | Lichtenthaeler | Nov. 7, 1933 |

FOREIGN PATENTS

| Number | Country | Date |
|---|---|---|
| 219,405 | Switzerland | May 16, 1942 |